United States Patent [19]

Nagami et al.

[11] 4,120,006
[45] Oct. 10, 1978

[54] RANDOM ACCESS RECORDING AND/OR PLAYBACK SYSTEM

[75] Inventors: Masaru Nagami, Yokohama; Kenji Hori, Tokyo; Hiromu Masaoka, Yokohama; Yoshio Kishi, Tokyo, all of Japan

[73] Assignee: Sony Corporation, Tokyo, Japan

[21] Appl. No.: 785,180

[22] Filed: Apr. 6, 1977

[30] Foreign Application Priority Data

Apr. 9, 1976 [JP] Japan .................................. 51-39869

[51] Int. Cl.$^2$ .............................................. G11B 5/09
[52] U.S. Cl. ......................................... 360/72; 360/49
[58] Field of Search ............................. 360/72, 62, 49

[56] References Cited

U.S. PATENT DOCUMENTS 3,564,161  2/1971  Takishima ............................. 360/72

*Primary Examiner*—John H. Wolff
*Attorney, Agent, or Firm*—Lewis H. Eslinger; Alvin Sinderbrand

[57] ABSTRACT

A random access system for recording and/or reproducing apparatus of the type used for recording information on and/or reproducing information from addressable portions of a record medium. The random access system is capable of recording address signals on the medium adjacent corresponding addressable portions and of playing back address signals from the medium so as to access any addressable portion thereof to reproduce information therefrom. The address signals are constituted by a variable number of address pulses plus a constant number of pulses. The random access system includes a counter for counting pulses which are applied thereto so as to derive a count corresponding to an address. A detector detects the constant number of pulses included in an address signal and supplies only the variable number of address pulses to the counter. A selector is operable to select any one of predetermined addresses, and a comparator compares the count derived by the counter to the address selected by the selector to produce a coincidence signal when the count is equal to the selected address. In a recording mode, an oscillator generates a substantially continuous train of pulse signals which are supplied through the detector to the counter. A record control circuit is operable to initiate an address recording operation for transmitting the train of pulses to the counter, and is responsive to the coincidence signal to terminate this address recording operation. In a playback mode, the recorded address signals are supplied through the detector to the counter. A sensing circuit is provided to sense the end of the played back address signal and to actuate a control signal generator which is responsive to the coincidence signal for generating a control signal which is adapted to initiate a predetermined operation of the recording and/or reproducing apparatus.

18 Claims, 43 Drawing Figures

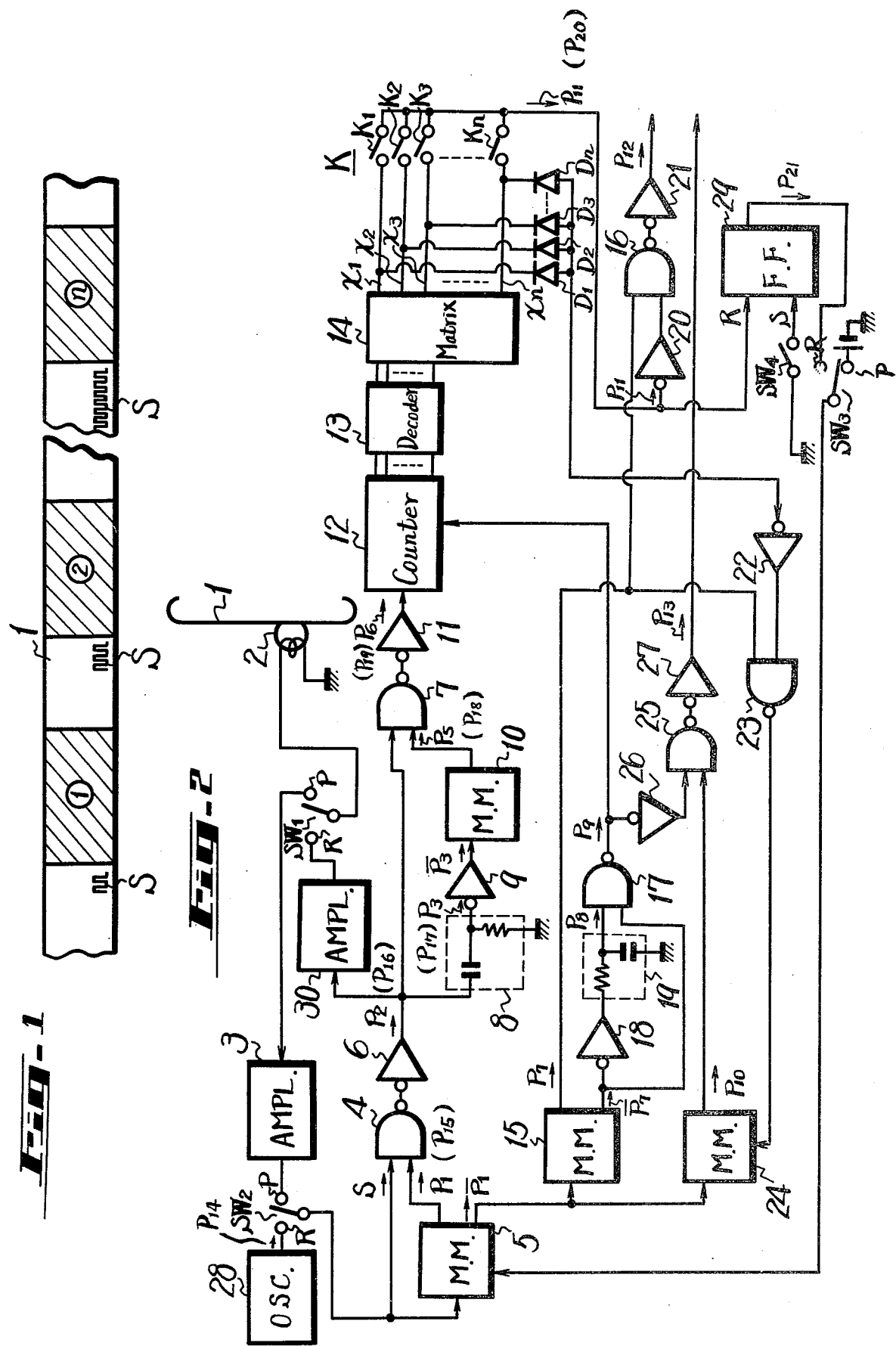

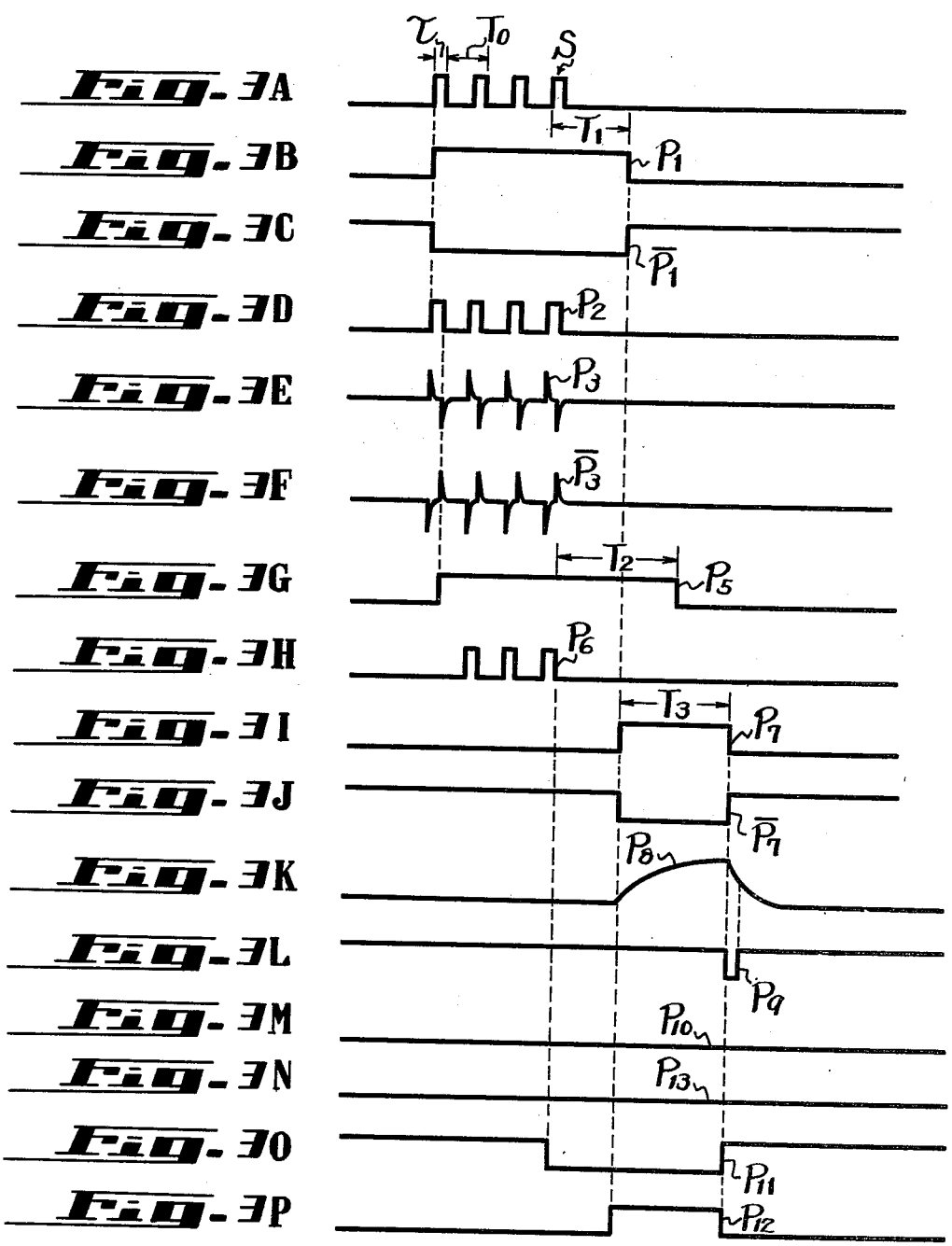

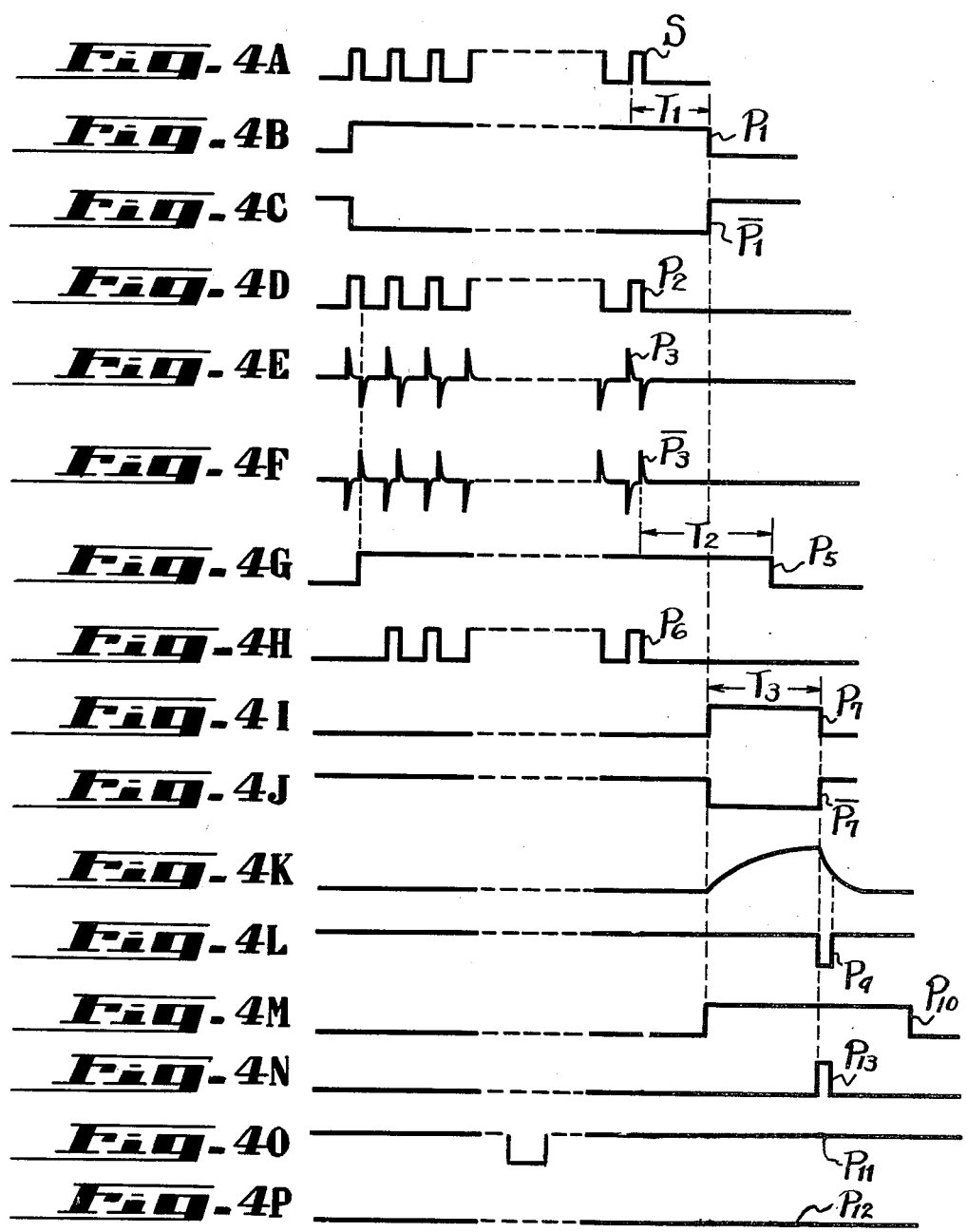

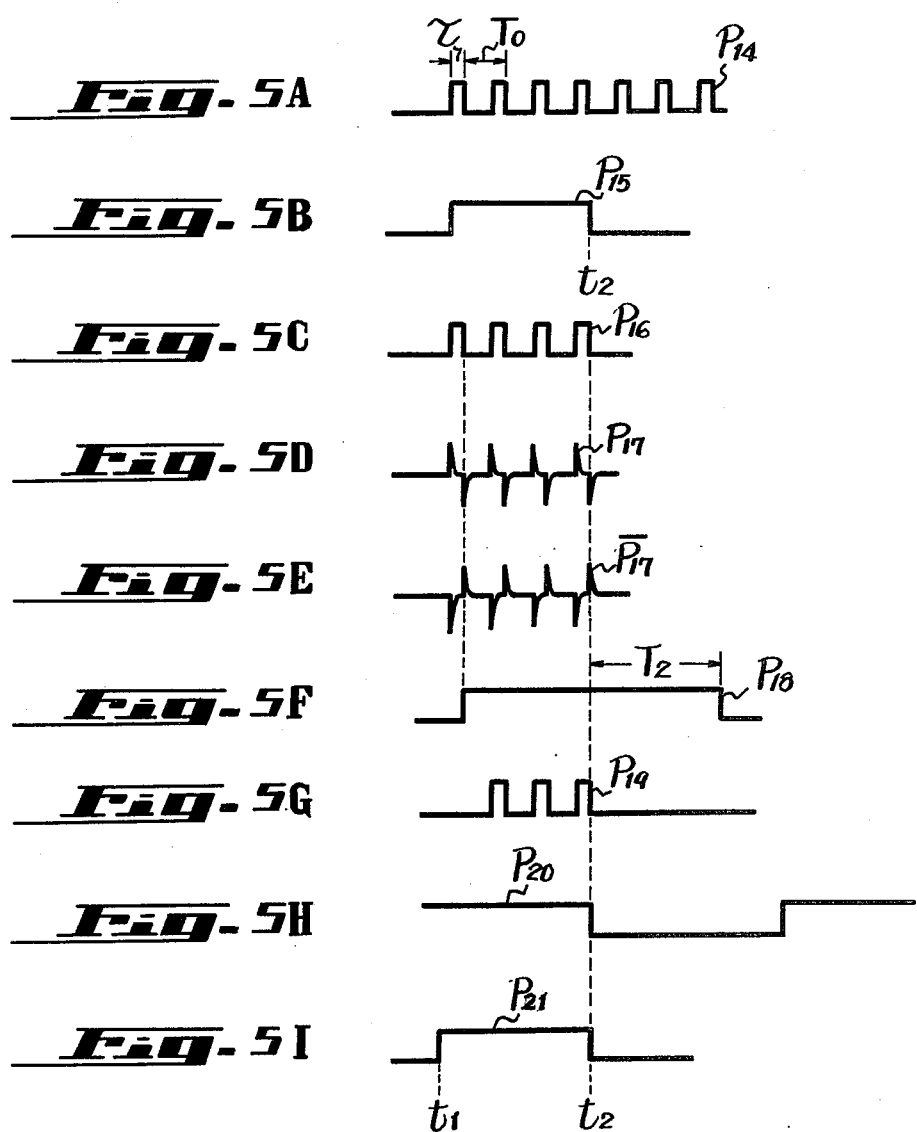

RANDOM ACCESS RECORDING AND/OR PLAYBACK SYSTEM

BACKGROUND OF THE INVENTION

This invention relates to a random access system and, more particularly, to a random access system for use in a recording and/or reproducing apparatus wherein predetermined addresses corresponding to selectable portions of a record medium can be recorded on and reproduced from the record medium, the address signals exhibiting a particular format which minimizes false operation.

In many recording/playback devices, such as tape recording apparatus, it is desirable to access random portions of the record medium, such as the record tape, so as to reproduce the information which had been recorded previously in such portions without requiring the reproduction of all of the information signals that are not in interest. That is, if the tape is moved from a first position therealong to a desired position, it often is preferred not to play back the signal information which had been recorded between such positions.

In a basic type of random access system, a predetermined pulse signal, such as a marker pulse, had been recorded on the record medium in advance of, or at the beginning portion of the useful signal information. Thus, if the signal information is recorded in successive, variable-length blocks, such marker pulses are recorded in between successive blocks. Then, if it is desired to access a particular block so as to reproduce only the signal information recorded in that block, the marker pulses are counted as the record medium is advanced accordingly. Then, when the proper number of such pulses had been counted, the desired block is in position for a playback operation. Unfortunately, with this type of basic random access system, all block-accessing must be referenced to the initial, or starting block. If initial operation of the record medium commences at some arbitrary, intermediate position, the marker pulse count may not correspond to the desired block location. For example, if the record medium is a magnetic tape, and if this tape is loaded onto suitable playback apparatus such that the first block which is positioned for a playback operation is, for example, block #6, then the counting of two marker pulses in, for example, the forward direction, will position the tape at block #8, rather than at block #2 which may have been the desired block.

One proposal to overcome this drawback of a basic random access system is to record, in advance of each block of information, a number of pulses corresponding to the block number. Thus, these pulses correspond to an address to identify the immediately following block of information. For example, one pulse will be recorded at the beginning portion of block #1, two pulses will be recorded at the beginning portion of block #2, three pulses will be recorded at the beginning portion of block #3, and so on. Then, during a playback operation, a desired block number can be accessed merely by counting the number of block-identifying pulses until the desired count is obtained. However, an attendant disadvantage of this type of random access system is that a spurious pulse may be erroneously interpreted as a block-identifying pulse and will be counted. For example, if the record medium comprises a record tape, such a spurious pulse might be located in the course of an information signal. Hence, when the record tape is scanned for the purpose of reading, or reproducing such block-identifying pulses, this spurious pulse will be detected and may erroneously alter the pulse-count. That is, there is no simple technique which can be used to distinguish between actual block-identifying pulses and spurious pulses.

OBJECTS OF THE INVENTION

Therefore, it is an object of the present invention to provide an improved random access system which overcomes the disadvantages and drawbacks noted above.

Another object of this invention is to provide an improved random access system wherein address pulses are recorded on and/or played back from a record medium, such address pulses being distinguishable from spurious pulses.

A further object of this invention is to provide an improved random access system for use in recording and/or reproducing apparatus wherein any selectable portion of a record medium can be accessed from any arbitrary location without referencing such record medium to the beginning portion thereof.

An additional object of this invention is to provide an improved random access system for use with a record medium wherein the record medium can be loaded onto signal reproducing apparatus in any condition, such loading need not be limited solely to a predetermined, or reference position of the record medium.

Still another object of this invention is to provide an improved random access system wherein address signals are recorded on a record medium, such address signals serving to identify corresponding selectable portions of the medium and being constituted by a variable number of address pulses plus a constant pulse number.

A still further object of the present invention is to provide a random access system wherein address signals are recorded at particular locations of a record medium so as to identify corresponding addressable portions of that medium, the address signals including a constant number of pulses, such as one or two pulses, which must be detected before an address can be registered, thereby preventing false operation due to the presence of spurious pulses.

Another object of this invention is to provide an improved random access system which is relatively simple and of inexpensive construction, yet which is capable of distinguishing between valid address signals and spurious noise signals.

Various other objects, advantages and features of the present invention will become readily apparent from the ensuing detailed description, and the novel features will be particularly pointed out in the appended claims.

SUMMARY OF THE INVENTION

In accordance with the present invention, a random access system is provided for use in record and/or reproducing apparatus so as to record and/or reproduce address signals onto or from an addressable record medium so that selectable portions of such medium can be accessed rapidly and randomly, thereby permitting information to be recorded and/or reproduced from such selectable portions. The address signals which are recorded are formed of a number of address pulses plus a constant pulse number. The random access system is comprised of a counter for counting pulses applied thereto so as to derive a count corresponding to an address; a detector for detecting the constant pulse number included in the address signals and to delete such constant pulse number from the pulses which are applied to the counter; a selector for selecting any one of predetermined addresses corresponding to selectable portions of the record medium; a comparator coupled to the counter and to the selector for comparing the count and the selected address so as to produce a coincidence signal when the count is equal to the selected address; and a control signal generator operable in response to the coincidence signal for generating a control signal which initiates a predetermined operation of the record and/or reproducing apparatus. In a recording mode, an oscillator generates a substantially continuous train of pulses which are applied to the counter through the detector, this supply of pulses being initiated at a desired time and being interrupted when the coincidence signal is produced. In a playback mode, reproduced address signals are supplied through the detector to the counter, and the coincidence signal is produced when the end of an address signal is sensed.

BRIEF DESCRIPTION OF THE DRAWINGS

The following detailed description, given by way of example, will best be understood in conjunction with the accompanying drawings in which:

FIG. 1 is a schematic representation of one embodiment of a record medium which can be used with the present invention;

FIG. 2 is a logic diagram of a preferred embodiment of the random access system in accordance with the present invention;

FIGS. 3A-3P are waveform diagrams which are useful in explaining the operation of the random access system shown in FIG. 2;

FIGS. 4A-4P are waveform diagrams which are useful in explaining one possible type of operation of the random access system shown in FIG. 2; and FIGS. 5A-5I are waveform diagrams which are useful in explaining another operation of the random access system shown in FIG. 2.

DETAILED DESCRIPTION OF A PREFERRED EMBODIMENT

In the interest of simplification, it will be assumed that the record and/or reproducing apparatus with which the random access system in accordance with the present invention can be used operates on a magnetic tape. However, it should be fully appreciated that various alternative types of record media can be used with this invention, such as a magnetic sheet, a magnetic disc, an optical record disc, or the like. Furthermore, the signal information which is recorded on and/or played back from the record medium may be analog information, such as audio signals, for example, musical signals, digital signals, or the like.

Referring now to FIG. 1, there is illustrated a schematic representation of a magnetic tape 1 upon which signal information is recorded in successive blocks, numbered as blocks 1, 2 . . . n. Adjacent blocks are separated by areas within which address signals S are recorded. Such address signals S are formed of a variable number N of address pulses plus a constant number k of pulses, the variable number N serving to identify the particular block which follows the address signals. For example, address signal S which identifies block 1 includes one address pulse, address signal S which identifies block 2 includes two address pulses, . . . and address signal S which identifies block n includes n address pulses. As an alternative, block 1 can be identified by, for example, a address pulses, block 2 can be identified by b address pulses, and so on. Thus, each block is identified by a particular, discrete number of address pulses. Hence, when tape 1 is advanced, address signals S are scanned by a playback transducer, or pick-up head, and the N address pulses are counted so as to derive a count which identifies the corresponding block. If the address signals are recorded in advance of a block, the block may exhibit a variable length. In an alternative embodiment, the address signals may be recorded on a separate track of tape 1 but, nevertheless, are associated with corresponding blocks. As will become apparent, tape 1 may be loaded onto suitable record and/or reproducing apparatus such that any particular block is randomly positioned with respect to a playback transducer, and the tape then can be moved until a desired, selected block is reached. The appropriate transport mechanism and signal playback electronics which are provided in such record and/or reproducing apparatus may be of conventional construction and form no part of the present invention per se. Hence, in the interest of brevity and simplification, such mechanism and electronics are not shown herein.

Turning now to FIG. 2, the illustrated random access system is adapted to record address signals S on tape 1 and to reproduce such address signals from the tape for the purpose of accessing a desired, addressable portion, or block, of the tape. The system includes a record/playback transducer, or head, 2 which is adapted to record pulse signals on tape 1 and to reproduce previously recorded pulse signals. If desired, separate record and playback heads may be used. Various record/playback changeover switches $SW_1$, $SW_2$ and $SW_3$ are provided for the purpose of selectively establishing either a record operation or a playback operation. These change-over switches are represented as having a movable contact which is engageable either with a recording contact R or a playback contact P so as to establish the appropriate mode of operation. The general arrangement of the illustrated random access system includes a counter for counting pulses supplied thereto, a selector for selecting a particular address, a comparator for comparing the count of the counter with the address established by the selector, a control signal generator responsive to this comparison, a sensor for sensing the end of a reproduced address signal, an error detector for detecting one type of error condition which may occur during a playback operation, as will be described, and a control circuit for controlling the recording of address signals. As mentioned above, the address signals include N address pulses, wherein N is a variable number, and k pulses, wherein k is a fixed number. A detector also is provided to detect these k pulses, either during a recording or a playback operation, and to delete these k pulses from the address signals so as to supply only N address pulses to the counter.

In the illustrated embodiment, the detector is comprised of a monostable multivibrator 5, a NAND gate 4, a differentiating circuit 8, a monostable multivibrator 10 and another NAND gate 7. Monostable multivibrator 5 may be a conventional one-shot circuit having stable and quasi-stable states. A positive transition applied to the monostable multivibrator circuit is effective to trigger this circuit to its quasi-stable state for a predetermined time, which time is a function of the particular time-constant parameters of the monostable multivibrator circuit. The monostable multivibrator circuit includes first and second output terminals for providing complementary binary signals. It will be assumed that when this circuit is in its quasi-stable state, a binary "1", which may be a relatively positive DC level, is provided at one output terminal, with a concomittent binary "0", provided at the other output terminal, and when the monostable multivibrator circuit is in its stable state, a binary "0" is provided at the first-mentioned output terminal while a binary "1" is provided at the other output terminal. Also, monostable multivibrator circuit 5 includes an enable input which is adapted to receive an enable signal represented as a positive DC level. The monostable mulitivibrator circuit cannot be triggered to its quasi-stable state unless an enable signal is applied to its enable input.

NAND gate 4 is a conventional coincidence circuit of the type which produces a binary "0" at its output terminal only if a binary "1" is provided at each of its input terminals. As will become apparent, other equivalent type of coincidence circuits can be used in place of the various NAND gates which are illustrated in FIG. 2.

Monostable multivibrator 5 is adapted to receive pulses via change-over switch $SW_2$. During a recording operation, these pulses are supplied from an oscillator 28 which is adapted to generate a substantially continuous train of pulse signals. During a playback operation, these pulses are applied to the monostable multivibrator from playback head 2 via change-over switch $SW_1$, a pulse amplifier 3 and change-over switch $SW_2$. This monostable multivibrator is of the retriggerable type, that is, it will remain in its quasi-stable state provided that pulses having a period less than the time constant of the monostable multivibrator are applied successively thereto. As will be discussed below, the time constant of this monostable multivibrator is $T_1$, which is greater than the period $T_0$ of the pulses which are supplied either by oscillator 28 or playback head 2. One output of this monostable multivibrator circuit is coupled to an input of NAND gate 4, and another input of this NAND gate is connected to receive the same pulses which are supplied to the monostable multivibrator circuit. The output of NAND gate 4, after being inverted by inverter 6, the latter circuit being a logical sense inverter so as to change a binary "1" to a binary "0" and to change a binary "0" to a binary "1", is supplied directly to one input of NAND gate 7 and through differentiator 8, an inverter 9 and monostable multivibrator circuit 10 to another input of this NAND gate. Monostable multivibrator circuit 10 has a time constant $T_2$ which also is greater than period $T_0$, and is similar to monostable multivibrator circuit 5, except that an enable input is not shown. However, it should be appreciated that a suitable enable input may be provided and this may be supplied with a constant operating potential.

As will be described below, the arrangement of differentiator circuit 8, inverter 9 and monostable multivibrator circuit 10 functions to enable NAND gate 7 after $k$ pulses have been applied. In the illustrated embodiment, NAND gate 7 is enabled to transmit the pulses applied thereto from NAND gate 4 after $k=1$ pulse has been detected. However, with some modifications, such as by providing an additional monostable multivibrator or other time constant circuit, NAND gate 7 may be enabled after $k=2$, 3 or more pulses have been detected.

During a recording operation, the pulses which are supplied to NAND gate 7 by NAND gate 4 also are supplied through a pulse amplifier 30 and change-over switch $SW_1$ to recording head 2.

The output of NAND gate 7 is applied via an inverter 11 to counter 12. This counter may be a conventional binary counter whose count is incremented in response to each pulse applied thereto. Counter 12 also includes a reset, or clear terminal which is adapted to respond to a clear pulse for returning the count of counter 12 to an initial value. The output of counter 12 is coupled to a decoder 13 which is conventional and is adapted to decode the binary count exhibited by the counter into a selected output signal. As an example, decoder 13 may be provided with multiple outputs corresponding to the maximum count which can be achieved by counter 12. Depending upon the particular count of the counter, a corresponding one of the outputs of decoder 13 will be provided with an output signal. If desired, decoder 13 may comprise any other conventional type of decoding circuitry. The output of decoder 13 is coupled to a matrix circuit 14 having plural output terminals $x_1, x_2, \ldots x_n$. As may be appreciated, the number of output terminals of matrix 14 preferably is equal to the number $n$ of addressable portions of tape 1. The matrix circuit is of a conventional type wherein an output signal is applied to a singular output terminal corresponding to the decoded signal which is received by the matrix circuit. In the illustrated preferred embodiment, this output signal is a binary "0". Hence, depending upon the count of counter 12, as decoded by decoder 13, a binary "1" is provided at each of output terminals $x_1, x_2, \ldots x_n$ of matrix 14, except the one output terminal which corresponds to the count. If desired, decoder 13 and matrix 14 may be combined in a single circuit.

Each of output terminals $x_1, x_2, \ldots x_n$ is connected to a corresponding selector switch $K_1, K_2, \ldots K_n$ in swtich array K. Each of these selector switches is adapted to be closed individually, such as by an operator. As may be recognized, whatever signal is provided at the corresponding output terminal of matrix 14 is supplied through the closed switch $K_1, K_2, \ldots K_n$ to an output lead. Thus, the switch array K and matrix 14 function, in combination, as a comparator circuit such that when the count obtained by counter 12 is equal to the address represented by the particular selector switch which is closed, a binary "0" is provided at the output lead which is connected in common to all of the selector switches.

The aforementioned lead which is connected in common to all of the selector switches is coupled through an inverter 20 to a NAND gate 16. This NAND gate is adapted to supply a control signal through an inverter 21 coupled thereto if the NAND gate is appropriately conditioned. Accordingly, another input of this NAND gate 16 is connected to a monostable multivibrator circuit 15 so as to receive a conditioning signal representing the end of an address signal, as will be described below. The resultant control signal which is produced by NAND gate 16 is used to initiate a predetermined operation of the record and/or reproducing apparatus. As one example of such operation, the tape transport of this apparatus is stopped in response to the control signal. As another example, if the tape transport had been operating in a relatively high speed scanning mode, the tape speed is reduced to a normal playback speed and the playback electronics included in the record and/or reproducing apparatus are energized. As yet another example, if the control signal is produced by NAND gate 16 during an address signal recording operation, the record and/or reproducing apparatus is changed over to a signal information recording operation.

Monostable multivibrator circuit 15 has a time constant $T_3$ which is greater than the period $T_0$ of the address pulses, and is substantially similar to aforedescribed monostable multivibrator circuit 5 except that an enable input is not shown. It may be appreciated that such an enable input may be provided and may be coupled to a suitable source of operating potential. As previously mentioned, one output of this monostable multivibrator circuit is coupled to NAND gate 16 to supply a conditioning signal thereto. The other output of this monostable multivibrator circuit is connected directly to one input of a NAND gate 17 and through an inverter 18 and time delay circuit 19 to another input of this NAND gate. As will be explained below, the combination of NAND gate 17, inverter 18 and time delay circuit 19 functions to differentiate the positive transition in the signal which is produced at this other output of monostable multivibrator circuit 15. That is, when the monostable multivibrator circit returns from its quasi-stable state to its stable state, a pulse indicative thereof is produced by NAND gate 17. It is this pulse which is used to reset counter 12.

The illustrated random access system also includes means for sensing if the pulses included in address signal S which are reproduced during a playback operation represent in invalid address. That is, if address pulses N are greater than the number $n$ of addressable portions, or blocks or tape 1, then these address pulses represent an improper, or erroneous address. The circuitry which is employed to detect such an erroneous address is comprised of diodes $D_1, D_2, \ldots D_n$, a NAND gate 23 and a monostable multivibrator 24. Diodes $D_1, D_2, \ldots D_n$ are connected to output terminals $x_1, x_2, \ldots x_n$, respectively, of matrix 14 and function as a multi-input OR circuit. The anodes of these diodes are connected in common and, as may be recognized, a binary "0" applied to any output terminal of matrix 14 is coupled through the corresponding diode to appear as a binary "0" at the commonconnected anodes. Conversely, if a binary "1" is applied to each of the output terminals of matrix 14, that is, if a binary "0" is not produced, such as if the count obtained by counter 12 is greater than $n$, then a binary "1" is produced at the common-connected anodes of the diodes.

The common connection of the anodes of diodes $D_1, D_2, \ldots D_n$ is connected via an inverter 22 to one input of NAND gate 23. The other input of this NAND gate is coupled to the first-mentioned output terminal of monostable multivibrator 15. Hence, NAND gate 23 is conditioned to respond to the binary signal supplied thereto by inverter 22 when monostable multivibrator 15 assumes its quasi-stable state. The output of this NAND gate is connected to the enable input of monostable multivibrator 24, this monostable multivibrator being substantially similar to monostable multivibrator 5. The trigger input of monostable multivibrator 24 is coupled to the other output of monostable multivibrator 5, such that circuit 24 is triggered to its quasi-stable state when monostable multivibrator 5 returns from its quasi-stable state to its stable state, as will be described.

The output terminal of monostable multivibrator 24 is coupled to an input of a NAND gate 25 so as to condition this NAND gate to respond to the signal which is applied to its other input. As shown, this other input of the NAND gate is coupled to the output of NAND gate 17 via inverter 26. Hence, NAND gate 25 produces an output pulse when monostable multivibrator 15 returns from its quasi-stable state to its stable state, provided that monostable multivibrator circuit 24 is in its stable state. This pulse is inverted by an inverter 27 and supplied to further apparatus (not shown) for terminating further operation of the record and/or reproducing apparatus.

A flip-flop circuit 29 is provided to control an address signal recording operation. This flip-flop circuit is a conventional bistate circuit having set and reset inputs which are responsive to negative transitions in the respective signals applied thereto so as to correspondingly change the state of flip-flop circuit 29. The set input of this flip-flop circuit is coupled to a reference potential via a selectively operable switch $SW_4$, which may be a manually operable switch, and the reset input of this flip-flop circuit is coupled to the lead which is connected in common to all of selector switches K. The output terminal of flip-flop circuit 29 produces a binary "1" when the flip-flop circuit is in its set state, as when switch $SW_4$ is closed, and a binary "0" when the flip-flop circuit is in its reset state, as when a positive comparison has been made between the count of counter 12 and the corresponding address selected by closing a particular one of switches K. This output terminal of the flip-flop circuit is coupled via change-over switch $SW_3$ to the enable input of monostable multivibrator circuit 5. As shown, the output of this flip-flop circuit is connected to the R contact of change-over switch $SW_3$, and the P contact of this change-over switch is supplied with an operating potential, such as a positive DC level as presented by the illustrated power supply.

The operation of the illustrated random access system now will be described. For the purpose of the present discussion, let it be assumed that this system is operating in the address signal playback mode, and that the constant number of pulses $k$ included in each recorded address signal is equal to 1 ($k=1$). Accordingly, all of change-over switches $SW_1$, $SW_2$ and $SW_3$ are in the playback state wherein each movable contact engages the P contact. As tape 1 moves past playback head 2, address signals S are reproduced having the pulse width and period as shown in FIG. 3A. These pulses are supplied though amplifier 3 to NAND gate 4 and to monostable multivibrator circuit 5. The monostable multivibrator circuit is triggered into its quasi-stable state in response to the first pulse which is reproduced, as shown in FIG. 3B. The time constant of this monostable multivibrator circuit is equal to $T_1$, and at the conclusion of this time, the monostable multivibrator circuit is expected to return to its stable state. However, if another pulse is received prior to the expiration of time $T_1$, the monostable multivibrator circuit is retriggered so as to remain in its quasi-stable state. Accordingly, a conditioning signal $P_1$ (FIG. 3B) is applied to condition NAND gate 4 such that this NAND gate responds to the pulses included in address signal S. The operation of the NAND gate inverts the polarity of these pulses, but inverter 6 restores such pulses to their original polarity, as represented by pulses $P_2$ (FIG. 3D).

Pulses $P_2$ are applied to NAND gate 7 but are not transmitted by this NAND gate until it has been conditioned to do so. That is, pulses $P_2$ are not transmitted through NAND gate 7 until a conditioning signal $P_5$ is applied to the NAND gate. In order to produce the conditioning signal $P_5$, pulses $P_2$ are differentiated into positive-going and negative-going pulses $P_3$ (FIG. 3E) which coincide with the positive and negative transitions, respectively, of pulses $P_2$. The differenitiated pulses $P_3$ are inverted by inverter 9 to form pulses $P_3$, as shown in FIG. 3F. As may be observed, the positive pulses of $P_3$ coincide with the negative transitions of pulses $P_2$, and these positive pulses trigger monostable multivibrator 10 to its quasi-stable state, thus producing the conditioning pulse $P_5$, shown in FIG. 3G. Monostable multivibrator 10 is retriggerable so as to maintain its quasi-stable state as long as the period between successive positive pulses $P_3$ is greater than its time constant $T_2$.

Since NAND gate 7 is conditioned by conditioning pulse $P_5$, a comparison between FIGS. 3D and 3G indicates that the NAND gate is not conditioned until after the first pulse included in pulses $P_2$ has been produced. Thus, this first pulse effectively is subtracted from pulses $P_2$, and NAND gate 7 responds to the remaining pulses. The polarity of these remaining pulses is inverted by NAND gate 7, but inverter 11 restores the original polarity to supply pulses $P_6$ (FIG. 3H) to counter 12. Thus, although the reproduced address signal S is, in this example, comprised of four pulses, the first pulse corresponds to the constant pulse number ($k=1$) and the remaining pulses correspond to the address pulses ($n=3$). NAND gate 7 is selectively actuated so as to subtract the first $k$ pulses from address signal S and to supply only the N address pulses to counter 12.

The counter is incremented by the N address pulses $P_6$ applied thereto so as to derive a count corresponding to this address. As the count of counter 12 is incremented, this incrementing count is decoded by decoder 13 and applied to matrix 14 so as to apply a binary "0" to its corresponding output terminal. Thus, when counter 12 is incremented to a count of 1, a binary "0" is applied only to output terminal $x_1$ of matrix 14. Then, when this count changes to a count of 2, the binary "0" is advanced to output terminal $x_2$. Finally, when the N-th address pulse is applied to counter 12 so as to increment the count to 3, the binary "0" is advanced to output terminal $x_3$. Let it be assumed that selector switch $K_3$, corresponding to the address of block 3, had been actuated, or closed. In this condition, as the binary "0" advances from one to the next output terminal of matrix 14, a binary "1" is applied to the output lead which is connected in common to all of selector switches K, as shown in FIG. 3O. However, when counter 12 reaches the count of 3, the binary "0" which then is applied to output terminal $x_3$ of matrix 14 is coupled through closed selector switch $K_3$ so as to be applied to the connecting lead, thereby producing a coincidence signal $P_{11}$ (FIG. 3O). If counter 12 is not incremented further, this coincidence signal $P_{11}$ remains, and is inverted by inverter 20 and applied as a binary "1" to NAND gate 16. However, at this time, the NAND gate is not yet conditioned to respond to this coincidence signal.

After the N-th address pulse is applied to monostable multivibrator 5, transmitted through NAND gate 4 and counted by counter 12, there are no further address pulses. Thus, at a time $T_1$ following this N-th address pulse, monostable multivibrator circuit 5 returns from its quasi-stable state to its stable state, as shown in FIGS. 3B and 3C. At this time, a positive transition is provided in the signal $P_1$ at the other output terminal of monostable multivibrator circuit 5 so as to trigger monostable multivibrator 15 to its quasi-stable state, thus producing the positive pulse $P_7$ (FIG. 3I). This positive pulse functions as a conditioning signal to condition NAND gate 16, whereupon the coincidence signal $P_{11}$ is transmitted through the conditioned NAND gate and then is inverted by inverter 21 to form a control signal $P_{12}$ (FIG. 3P). This control signal is applied to further apparatus (not shown) so as to halt further movement of tape 1 in the record and/or reproducing apparatus. Of course, if desired, control signal $P_{12}$ can be used to initiate any other predetermined operation, such as initiating a signal information playback mode, or the like.

After the N-th pulse in address signal S has terminated, pulses $P_3$ no longer are applied to monostable multivibrator circuit 10. Hence, at a time $T_2$ following this N-th pulse, the monostable multivibrator circuit returns to its stable state, resulting in a negative transition in conditioning pulse $P_5$, as shown in FIG. 3G. This prevents any additional pulses which might be sensed, such as spurious pulses or the like, from being applied to and counted by counter 12.

At a time $T_3$ following the triggering of monostable multivibrator 15, this monostable multivibrator returns to its stable state, as shown in FIGS. 3I and 3J. Thus, pulse $P_7$ returns to a binary "0", thereby inhibiting further operation of NAND gate 16. At the same time, the complementary pulse $\overline{P_7}$ undergoes a positive transition so as to supply a binary "1" to one input of NAND gate 17. While monostable multivibrator circuit 15 had been in its quasi-stable state, the signal $\overline{P_7}$ had been a binary "0" (FIG. 3J), and this binary "0" had been inverted so as to charge the capacitor included in time delay circuit 19, as shown in FIG. 3K. Now, when signal $\overline{P_7}$ returns to its binary "1" condition, the capacitor included in the time delay circuit cannot discharge instantaneously. Hence, while this capacitor is discharging (FIG. 3K) NAND gate 17 is conditioned to produce reset pulse $P_9$ (FIG. 3L). This reset pulse has a duration which is determined by the discharge time constant of time delay circuit 19 and resets counter 12 to an initial count, such as a count of 0. When the counter is reset, it is appreciated that its count is not equal to the address which had been selected by closing selector switch $K_3$. Hence, coincidence signal $P_{11}$ terminates (shown in FIG. 3O), thereby terminating control signal $P_{12}$ (as shown in FIG. 3P). Thus, the illustrated random access system is prepared for reuse so as to detect the next address signal S which may be desired.

In the foregoing example, it had been assumed that the number N of address pulses which are detected in address signal S is within the range of addressable blocks of information. In particular, it had been assumed that $N=3$. Thus, a binary "0" had been provided at one of the output terminals of matrix 14 (specifically, output terminal $x_3$), thereby energizing inverter 22 to apply a binary "1" to NAND gate 23. Thus, when monostable multivibrator circuit 15 had been triggered to its quasi-stable state, NAND gate 23 had been conditioned to apply a binary "0" to the enable input of monostable multivibrator circuit 24, thereby preventing this latter circuit from responding to the positive transition in signal $P_1$. Hence, signal $P_{10}$ (FIG. 3M) and signal $P_{13}$ (FIG. 3N) each had remained as a binary "0". Let it now be assumed that the number of pulses which are reproduced by playback head 2 is greater than the number of pulses which can represent $n$-th address. This may be caused by detecting spurious pulses, or because of some other misoperation either during a playback operation or during an address recording operation.

Such an address signal, which is constituted by an excessive number of pulses, is represented in FIG. 4A.

As address signals S are received, monostable multivibrator circuits 5, 10 and 15, as well as counter 12, decoder 13 and matrix 14 function in the same manner as described hereinabove and as shown with respect to FIGS. 3A–3P. Thus, the operation of these circuits in the event that address signal S includes an excessive number of pulses, is shown in FIGS. 4A–4P which correspond to FIGS. 3A–3P, respectively. However, it should be appreciated that the binary "0" which is advanced from one to the other output terminals of matrix 14 as counter 12 is incremented does not remain at any one output terminal. That is, when counter 12 reaches the count of $n$, the binary "0" is produced at output terminal $x_n$. However, when counter 12 next is incremented, the binary "0" at output terminal $x_n$ is replaced by a binary "1", and each of output terminals $x_1, x_2, \ldots x_n$ is provided with a binary "1". Thus, regardless of which selector switch K has been actuated, a binary "1" will not be applied to NAND gate 16 by inverter 20. Furthermore, a binary "0" will not be applied to the common-connected anodes of diodes $D_1, D_2, \ldots D_n$. Rather, when the count of counter 12 exceeds the count $n$, a binary "1" is supplied by these diodes to inverter 22, thus applying a binary "0" to NAND gate 23, resulting in a binary "1" supplied as an enabling signal to the enable input of monostable multivibrator 24.

Now, at time $T_1$ following the last pulse included in address signal S, monostable multivibrator circuit 5 returns to its stable state, as represented by the positive transition in signal $P_1$ (FIG. 4C). This positive transition is applied to monostable multivibrator circuit 24, which had been enabled by the enable signal applied thereto by NAND gate 23. Thus, monostable multivibrator circuit 24 is triggered to its quasi-stable state to produce the signal $P_{10}$ shown in FIG. 4M. This binary "1" conditions NAND gate 25 to respond to the inverted version of reset pulse $P_9$ at the time that monostable multivibrator 15 returns to its stable state, as shown in FIGS. 4J and 4L. At that time, NAND gate 25, which had been conditioned by signal $P_{10}$, produces a negative-going pulse which is inverted by inverter 27 to form the pulse $P_{13}$ shown in FIG. 4N. This pulse $P_{13}$ is adapted to be used by the record and/or reproducing apparatus (not shown) to terminate further operation thereof. If desired, this pulse also can be used to energize a suitable warning, or alarm, indicative of an erroneous address condition.

It may be appreciated that, while counter 12 is incremented in response to address signal S (FIG. 4A), a coincidence signal $P_{11}$ may be produced. However, this coincidence signal will be produced prior to the termination of the address signal and, therefore, will not result in control signal $P_{12}$.

As in the operation discussed with respect to FIGS. 3A–3P, reset pulse $P_9$ is produced at the conclusion of address signal S so as to reset counter 12 to its initial count. At the conclusion of the time constant of monostable multivibrator 24, it returns to its stable state, as shown in FIG. 4M.

The manner in which the random access system shown in FIG. 2 is used to record an address signal now will be described with particular reference to the waveform diagrams shown in FIGS. 5A–5I. In the recording mode, change-over switches $SW_1$, $SW_2$ and $SW_3$ are in the recording state wherein their respective movable contacts engage contact R. Initially, let it be assumed that flip-flop circuit 29 is in its reset state so as to apply a binary "0" through switch $SW_3$ to the enable input of monostable multivibrator circuit 5. Thus, although oscillator 28 supplies pulses $P_{14}$ to the monostable multivibrator circuit, this circuit cannot be triggered until an enable signal is applied to its enable input. The pulses $P_{14}$ which are produced by oscillator 28 are contained in a substantially continuous train of pulses whose period $T_0$ and pulse duration are substantially equal to the period and pulse duration of the pulses included in address signal S as reproduced by playback head 2 during a playback operation.

When an address signal is to be recorded, an appropriate one of selector switches K is actuated, or closed, and a START switch $SW_4$ is energized. For the purpose of the present example, let it be assumed that the address represented by selector switch $K_3$ is selected. Now, when switch $SW_4$ is closed, flip-flop circuit 29 is triggered to its set state so as to apply a binary "1" as the enable signal to the enable input of monostable multivibrator circuit 5, as shown in FIG. 5I. At the occurrence of the first pulse $P_{14}$ following the setting of flip-flop circuit 29, monostable multivibrator circuit 5 is triggered to its quasi-stable state to apply the signal $P_{15}$ to NAND gate 4, as shown in FIG. 5B. Thus, the NAND gate is conditioned to transmit pulses $P_{14}$ which are applied thereto by oscillator 28, these transmitted pulses having their polarity inverted and then returned by inverter 6 to their initial polarity, as represented by pulses $P_{16}$ (FIG. 5C). These pulses are supplied through pulse amplifier 30 and switch $SW_1$ to record head 2 for recording on tape 1.

Pulses $P_{16}$ also are applied to NAND gate 7 and through differentiator 8 (to form the differentiated pulses $P_{17}$ shown in FIG. 5D) and inverter 9 (to invert the polarity of the differentiated pulses, as shown by the pulses $P_{17}$ shown in FIG. 5E) to trigger monostable multivibrator circuit 10. As discussed previously, this monostable multivibrator circuit is triggered to its quasi-stable state in response to the first positive pulse included in pulses $P_{17}$, as represented by the signal $P_{18}$ (FIG. 5F). Signal $P_{18}$ conditions NAND gate 7 to transmit all but the first pulse included in pulses $P_{16}$. That is, since monostable multivibrator circuit 10 is triggered to its quasi-stable state only after the first pulse included in pulses $P_{16}$ has terminated, this first pulse is not transmitted.

NAND gate 7 and inverter 11 supply pulses $P_{19}$ to counter 12. Accordingly, the count of counter 12 is incremented, and matrix 14 advances the binary "0" from one of its output terminals to the next, as counter 12 is incremented.

It has been assumed that selector switch $K_3$ is closed, corresponding to an address signal containing three address pulses. Thus, when counter 12 is incremented to the count of three, matrix 14 applies the binary "0" to its output terminal $x_3$. This binary "0" is coupled through closed selector $K_3$ as signal $P_{20}$ (FIG. 5H) which, in turn, is inverted by inverter 20 and then applied to NAND gate 16. At this time, signal $P_{20}$ is applied to the reset input of flip-flop circuit 29, and the negative transition in this signal serves to reset the flip-flop circuit. When this flip-flop circuit is reset, signal $P_{21}$ undergoes a negative transition, as shown in FIG. 5I at time $t_2$. Consequently, the enable signal now is removed from the enable input of monostable multivibrator circuit 5, thereby returning this monostable multivibrator circuit to its stable state, as shown in FIG. 5B. As described previously, when monostable multivibrator circuit 5 returns to its stable state, the signal $P_1$ undergoes a positive transition so as to trigger monostable multivibrator circuit 15 to its quasi-stable state, resulting in the signal $P_7$ as a binary "1" (such as shown in FIGS. 3I and 4I). Hence, a binary "1" now is applied to each input of NAND gate 16, thereby actuating this NAND gate to produce a binary "0" which is inverted by inverter 21 to form the signal $P_{12}$ (see FIG. 3B), which initiates a predetermined operation in the record and/or playback apparatus (not shown). That is, when oscillator 28 generates a number of pulses equal to $k$, the constant pulse number, plus $n$, the number of address pulses corresponding to the address selected by the particular selector switch K which is closed, further movement of tape 1 in the record and/or playback apparatus is halted because of signal $P_{12}$. Also, when monostable multivibrator circuit 5 returns to its stable state, the signal $P_{15}$ (FIG. 5B) is terminated, thereby disabling, or inhibiting NAND gate 4. Hence, further pulses $P_{14}$ cannot be transmitted through this NAND gate to recording head 2. Also, further pulses no longer are transmitted to retriggerable monostable multivibrator circuit 10. Therefore, at the conclusion of its time constant $T_2$ following the last transmitted pulse $P_{17}$ monostable multivibrator circuit 10 returns to its stable state, as shown in FIG. 5F.

It is recalled that at a time $T_3$ following the triggering of monostable multivibrator circuit 15 to its quasi-stable state, this monostable multivibrator circuit returns to its stable state, as shown in FIGS. 3I, 3J, 4I and 4J. Therefore, as described previously, reset pulse $P_9$ is generated at a predetermined time following the return of monostable multivibrator circuit 5 to its stable state. This reset pulse resets the count of counter 12 to an initial count, such as zero.

Thus, after an address signal formed of $k$ plus N pulses is recorded on tape 1, the illustrated random access system is prepared for reuse to record another address signal, as desired.

While the present invention has been particularly shown and described with reference to a preferred embodiment thereof, it should be readily apparent that various changes and modifications in form and details may be made by one of ordinary skill in the art without departing from the spirit and scope of this invention. For example, the NAND gates shown in FIG. 2 may be replaced by other, equivalent coincidence circuits. Also, although the combination of differentiator 8 and monostable multivibrator 10 functions to delete, or subtract only the first pulse in the train of pulses $P_2$ or $P_{16}$ applied thereto, it should be readily apparent that modifications may be made so as to delete the first $k$ pulses therefrom. For example, a circuit similar to that formed of NAND gate 7, differentiator 8, inverter 9, monostable multivibrator circuit 10 and inverter 11 may be added between the illustrated connection of inverter 11 and counter 12, this additional circuit cooperating with the illustrated circuit to delete the first two pulses from pulse train $P_2$ or $P_{16}$. As another example, a conventional counter circuit may be substituted for the combination of differentiator 8, inverter 9 and monostable multivibrator circuit 10 so as to condition NAND gate 7 after a predetermined count of pulses $P_2$ (or $P_{16}$) has been reached. This count may be equal to $k$, wherein $k = 1, 2, \ldots$ etc. as desired.

In accordance with a still further embodiment of the present invention, the comparator circuit formed of decoder 13, matrix 14, output terminals $x_1, x_2, \ldots x_n$ and selector switches K may be replaced by other, conventional comparator circuits. Also, in order to simplify the foregoing explanation, it had been assumed that the number of pulses included in the address signal recorded on tape 1 is equal to the number of the block of information which then follows these recorded address signals. However, as may be appreciated, any number N of pulses can be used to identify the address of the next succeeding block of signal information. Still further, in order to facilitate random access of a desired block of information regardless of the direction in which tape 1 is moved during an address scanning operation, address signals S can be recorded in advance of a block of information and also immediately following that block. Thus, during a scanning operation, a desired block can be accessed regardless of the direction in which tape 1 is moved.

It is intended that the scope of the appended claims be interpreted so as to cover the foregoing as well as other similar changes and modifications.

What is claimed is:

1. A random access system for recording and/or reproducing apparatus of the type used for recording information on and/or reproducing information from selectable portions of a record medium, said record medium having address signals selectively recorded thereon to identify corresponding ones of said selectable portions, said address signals including a number of address pulses plus a constant pulse number, said random access system being operable to access selectable portions of said record medium and comprising:

detecting means for detecting said address signals recorded on said record medium;
    counting means coupled to said detecting means for counting said address pulses to derive a count corresponding to the address of a respective portion of said record medium;
    selecting means for selecting any one of said selectable portions of said record medium;
    comparing means coupled to said counting means and to said selecting means for comparing the count derived by said counting means to the selectable portion selected by said selecting means and for producing a coincidence signal when said count corresponds to the selected portion;
    sensing means for sensing the end of an address signal detected by said detecting means; and
    control signal generating means responsive to said coincidence signal when the end of said address signal is sensed for generating a control signal to initiate a predetermined operation of said recording and/or reproducing apparatus.

2. The system of claim 1 wherein said detecting means includes means for subtracting said constant number from said address signal and for supplying the remainder of said address signal to said counting means.

3. The system of claim 2 wherein said means for subtracting comprises means for inhibiting signals from being supplied to said counting means in the event that said detecting means does not detect more than said constant number.

4. The system of claim 3 wherein said address signal is formed of N address pulses plus $k$ pulses, N being a number identifying a corresponding selectable portion of said record medium and $k$ being 1 or 2; and wherein said subtracting means comprises means for detecting the first $k$ pulses of an address signal, and means for actuating said means for inhibiting until after the k-th pulse is detected.

5. The system of claim 4 wherein said means for inhibiting comprises gating means having a control input, a signal input coupled to said detecting means for receiving said address signals and an output coupled to said counting means for supplying an address signal to said counting means if a control signal is applied to said control input; and said means for actuating comprises control signal generating means responsive to the k-th pulse for supplying a control signal to said gating means control input for a duration at least equal to the remaining N address pulses included in said address signal.

6. The system of claim 5 wherein k is 1; and wherein said means for detecting the first k pulses comprises differentiating means to differentiate the trailing edges of the pulses included in said address signal for producing a trigger pulse at the trailing edge of the first pulse in said address signal; and said control signal generating means comprises a retriggerable pulse generator responsive to said trigger pulse and to successive differentiated pulses for generating said control signal until the termination of said address signal.

7. The system of claim 1 wherein said sensing means comprises retriggerable pulse generating means responsive to the first and successive pulse signals included in an address signal for generating an actuating pulse, said actuating pulse terminating at a predetermined time following the last pulse signal in said address signal; and means for producing an enabling signal at the termination of said actuating pulse.

8. The system of claim 7 wherein said control signal generating means comprise gate means having an enabling input connected to receive said enabling signal, a signal input connected to receive said coincidence signal and an output for generating said control signal when said coincidence and enabling signals are received.

9. The system of claim 1 wherein said means for producing an enabling signal comprises timing means for producing an enabling pulse of predetermined time duration; and reset means responsive to the termination of said enabling pulse for resetting said counting means to an initial count thereof.

10. The system of claim 1 wherein said comparing means includes means for determining that a detected address signal does not identify a selectable portion of said record medium; and means responsive to said sensing means and to said means for determining for producing a stop signal adapted to terminate the operation of said recording and/or reproducing apparatus.

11. The system of claim 10 wherein said means for determining comprises means for sensing the absence of a coincidence signal to produce an enabling signal; and said means for producing a stop signal comprises a triggerable pulse generator having a trigger input coupled to said sensing means and an enable input connected to receive said enabling signal to enable the production of said stop signal when the end of an address signal is sensed.

12. The system of claim 10 wherein said comparing means comprises means coupled to said counting means and having a predetermined number of output terminals equal to the number of selectable portions of said record medium, said last-mentioned means decoding the derived count from said counting means to apply a decoded signal to the output terminal corresponding to said derived count; and wherein said means for determining comprises OR circuit means coupled to all of said output terminals for sensing when none of said output terminals is provided with a decoded signal, thereby representing that the address of a respective portion of said record medium as represented by the count of said counting means does not identify a selectable portion of said record medium, to provide an enabling signal; and said means for producing a stop signal comprises a triggerable pulse generator coupled to said sensing means and an enable input connected to receive said enabling signal to enable said pulse generator to produce said stop signal when the end of an address signal is sensed.

13. The system of claim 1 further comprising address signal recording means for recording said address signals at predetermined locations on said record medium, said address signal recording means comprising oscillating means for generating pulse signals constituting said address pulses and said constant number included in said address signals; recording means for receiving said pulse signals and recording same on said record medium; means included in said detecting means for receiving said generated pulse signals and for subtracting said constant number therefrom to supply only said address pulses to said counting means; said selecting means being operable to select a predetermined address to identify a selectable portion of said record medium; and means responsive to said coincidence signal produced by said comparing means when the count derived by said counting means equals the predetermined address selected by said selecting means for inhibiting the recording of further pulse signals.

14. The system of claim 13 further comprising record/playback selecting switch means having a record condition for transmitting said generated pulses to said detecting means and to said recording means, and a playback condition for transmitting address signals reproduced from said record medium to said detecting means.

15. The system of claim 14 wherein said detecting means comprises gating means for receiving said pulse signals and said address signals transmitted to said detecting means; and actuable timing means responsive to said pulse signals and to said address signals for conditioning said gating means to supply said pulse signals and said address signals to said counting means and to supply said pulse signals to said recording means when said record/playback selecting switch means is in said record condition.

16. The system of claim 15 wherein said means for inhibiting the recording of further pulse signals comprises a start switch for initiating an address signal recording operation; and bistate means responsive to the operation of said start switch for assuming a first state to apply an actuating signal to said timing means to enable said timing means to respond to said pulse signals, said bistate means being responsive to said coincidence signal for assuming a second state to terminate said actuating signal, whereby said actuable timing means inhibits said gating means.

17. The system of claim 16 wherein said means included in said detecting means for subtracting said constant number from said generated pulse signals comprises a gate circuit having a signal input connected to receive the pulse signals supplied by said conditioned gating means and an enable input connected to receive an enable signal so as to transmit said received pulse signals to said counting means; and means for detecting the $k$-th pulse signal generated by said oscillating means, $k$ being equal to 1 or 2, for producing said enable signal.

18. In record/reproducing apparatus for recording information on and reproducing information from addressable portions of a record tape, a random access system for recording address signals on said tape adjacent corresponding addressable portions and for playing back address signals from said tape so as to access any addressable portion thereof to reproduce information therefrom, the address signals being constituted by $k$ pulses plus N address pulses, wherein $k$ is a constant number and N is a variable representing an address, said system comprising:

counting means for counting pulses applied thereto for deriving a count corresponding to an address;

gating means for receiving said address signals and for supplying said N address pulses included in said address signals to said counting means;

detecting means for detecting the first $k$ pulses included in said address signals to then actuate said gating means;

selecting means for selecting any one of predetermined addresses corresponding to said addressable portions of said record tape;

comparing means coupled to said counting means and to said selecting means for comparing the count derived by said counting means to the address selected by said selecting means to produce a coincidence signal when said count is equal to said selected address;

actuable control signal generating means responsive to said coincidence signal for generating a control signal to initiate a predetermined operation of said record/reproducing apparatus;

record;playback transducer means for selectively recording said address signals on and playing back said address signals from said record tape;

oscillating means for generating a substantially continuous train of pulse signals;

record/playback switch means having a record condition to supply said train of pulse signals to said gating means and said detecting means and to said record/playback transducer means, and a playback condition to supply said address signals from said transducer means to said gating means and said detecting means;

record control means being operable to initiate an address recording operation for transmitting said train of pulse signals to said gating means and said detecting means and to said transducer means, and responsive to said coincidence signal to terminate said address recording operation; and sensing means responsive to said address signals played back by said transducer means for sensing the end of an address signal to apply an actuating signal to said actuable control signal generating means.

* * * * *